United States Patent
Kupfer et al.

(10) Patent No.: US 9,750,237 B1
(45) Date of Patent: Sep. 5, 2017

(54) COVERED LIQUID GRAVITY FEED ANT ELIMINATION SYSTEM AND COVER ASSEMBLIES FOR BIOLOGICAL INSECT PEST CONTROL

(71) Applicant: KM INVESTORS, LLC, Nokomis, FL (US)

(72) Inventors: Kenneth J. Kupfer, Nokomis, FL (US); Robert E. McManus, Nokomis, FL (US)

(73) Assignee: KM INVESTORS, LLC, Nokomis, FL (US)

( * ) Notice: Subject to any disclaimer, the term of this patent is extended or adjusted under 35 U.S.C. 154(b) by 0 days.

(21) Appl. No.: 15/190,661

(22) Filed: Jun. 23, 2016

Related U.S. Application Data (60) Provisional application No. 62/389,013, filed on Feb. 16, 2016.

(51) Int. Cl.
*A01M 1/02* (2006.01)
*A01M 1/04* (2006.01)
(Continued)

(52) U.S. Cl.
CPC ............... *A01M 1/08* (2013.01); *A01M 1/02* (2013.01); *A01M 1/04* (2013.01); *A01M 1/10* (2013.01); *A01M 1/2005* (2013.01)

(58) Field of Classification Search
CPC .......... A01M 1/00; A01M 1/02; A01M 1/023; A01M 1/026; A01M 1/04; A01M 1/10;
(Continued)

(56) References Cited

U.S. PATENT DOCUMENTS

| 5,305,541 A * | 4/1994 | Simpson ............. A01M 31/008 43/1 |
| 6,339,897 B1 * | 1/2002 | Hayes .................. A01M 1/205 43/125 |

(Continued)

FOREIGN PATENT DOCUMENTS

WO    2006/046067 A1    5/2006

OTHER PUBLICATIONS

International Search Report and Written Opinion for PCT/US2016/052113 dated Nov. 18, 2016 (9 pages).

*Primary Examiner* — David Parsley
(74) *Attorney, Agent, or Firm* — Shumaker, Loop & Kendrick, LLP (57) ABSTRACT

Disclosed are devices for eliminating airborne and crawling insect pests including a base carrying a membrane ring and insect feeding pool; a stem mounted to the base having a lower portion that covers the membrane ring; a reservoir positioned atop the stem, the reservoir adapted to contain liquid bait; stress duct openings disposed in the stem for metering flow of the liquid bait from the reservoir to the insect feeding pool; and a cover positioned atop the reservoir and extending radially outward therefrom to span and cover the base, the cover housing at least one of a metered bioattractant dispenser, a metered biopathogen dispenser, a light source, and a solar panel. Also disclosed are pest control device cover assemblies configured for attachment to existing pest control device(s) that allow for enhanced elimination airborne and crawling insect pests.

21 Claims, 6 Drawing Sheets

(51) Int. Cl.
  *A01M 1/10* (2006.01)
  *A01M 1/20* (2006.01)
  *A01M 1/08* (2006.01)

(58) Field of Classification Search
  CPC .... A01M 1/103; A01M 1/106; A01M 1/2005;
       A01M 1/2011; A01M 1/2016
  USPC ................ 43/107, 113, 122, 124, 131, 132.1
  See application file for complete search history.

(56) References Cited

U.S. PATENT DOCUMENTS

| | | |
|---|---|---|
| D460,573 S | 7/2002 | Gee, II |
| 6,467,216 B2 | 10/2002 | McManus et al. |
| 6,669,105 B2 | 12/2003 | Bryan et al. |
| 6,854,208 B1 | 2/2005 | Chuang et al. |
| 6,966,500 B1 * | 11/2005 | Kelley ................ A01M 31/008 239/34 |
| 7,278,235 B2 | 10/2007 | Kupfer et al. |
| 7,540,433 B2 | 6/2009 | Fleming et al. |
| 7,687,744 B2 | 3/2010 | Walter et al. |
| 7,785,541 B1 * | 8/2010 | Fiorello ............. A01M 1/2038 222/61 |
| 7,954,667 B2 | 6/2011 | Furner et al. |
| 8,430,337 B2 | 4/2013 | Pearce, III et al. |
| 8,887,954 B2 | 11/2014 | Carpenter et al. |
| 2002/0095856 A1 | 7/2002 | McManus et al. |
| 2005/0211798 A1 | 9/2005 | Garcia et al. |
| 2009/0020073 A1 * | 1/2009 | Hansen ................ A01K 5/0291 119/51.11 |
| 2010/0031556 A1 | 2/2010 | Kupfer et al. |
| 2010/0063640 A1 * | 3/2010 | Olmstead ............ A01M 31/008 700/283 |

\* cited by examiner

COVERED LIQUID GRAVITY FEED ANT ELIMINATION SYSTEM AND COVER ASSEMBLIES FOR BIOLOGICAL INSECT PEST CONTROL

CROSS-REFERENCE TO RELATED APPLICATION

This application claims priority to U.S. Patent Provisional Application No. 62/389,013 filed on Feb. 16, 2016, which is incorporated herein by reference in its entirety.

TECHNICAL FIELD

This invention relates to the field of pest control, and more particularly, to covered pest control devices and cover assemblies for retrofitting on Liquid Gravity-Feed Ants Elimination System (LGFAES) devices for targeting specific airborne and crawling insect species.

BACKGROUND

U.S. Pat. No. 6,467,216, invented by Robert McManus and Kenneth Kupfer, discloses an ideal device for controlling insect pest species including, for example, various species of ants. Unlike many pest control methods and devices, this device provides a weather-tolerant, high volume, continuous feed liquid insect bait delivery platform for effectively controlling and/or eliminating various insect and pest species.

U.S. Pat. No. 7,278,235, also invented by Robert McManus and Kenneth Kupfer, further discloses methods and devices for applying species-specific biological pathogens and other similar active ingredients to targeted insects attracted to the LGFAES, and upon leaving the LGFAES, these insects become vectors for transferring the active ingredients to other targeted insects, thus resulting in remote, episodic elimination of insects and/or an insect infestation.

While the above discussed devices and methods efficiently target and control certain insect species/populations including, for example, various ant species, improvements to these devices and methods can be made to further specifically target and control certain additional insect species, such as for example, mosquitoes, aphids, psyllids, mealybugs, scale and other plant sucking, disease vectoring homoptera, fruit flies, diamondback moth and balsam woolly adelgid, ticks, bedbugs, termites, cinch bugs, and many other arthropods that were not previously provided for.

SUMMARY

Therefore a need exists to provide covered devices and/or cover assemblies that retrofit existing devices (e.g., LGFAES) that target specific airborne and crawling insect species, such as for example, mosquitoes, aphids, psyllids, mealybugs, scale and other plant sucking, disease vectoring homoptera, ants, fruit flies, diamondback moth and balsam woolly adelgid, ticks, bedbugs, termites, cinch bugs, and many other arthropods.

These covered devices and/or cover assemblies preferably lure targeted insects thereto with species specific insect attractants and contact the targeted insect(s) with a biopathogen (e.g., potentially a species specific biopathogen) and/or a bio-friendly active ingredient (e.g., bio-friendly pesticide) while within or in close proximity to the covered devices and/or cover assemblies. After being contacted with the biopathogen and/or bio-friendly active ingredient, the targeted insect subsequently leaves the device and returns to, for example, its colony thereby contaminating other insects with the biopathogen and/or bio-friendly active ingredient as they mate, feed or otherwise contact, and as a consequence eliminates those species contacted both directly or indirectly with the biopathogen and/or bio-friendly active ingredient over a period of time. The disclosed devices and/or cover assemblies thus provide for targeted, species specific pest control of various airborne and crawling insect species preferably resulting in mass remote extermination upon leaving the device and/or cover assemblies.

Specifically disclosed are devices for eliminating airborne and crawling insect pests including a base carrying a membrane ring impregnated or coated with an active ingredient thereon and an insect feeding pool; a stem mounted to the base having a lower portion that covers the membrane ring and feeding pool; a reservoir positioned atop the stem, the reservoir adapted to contain liquid bait; a valve (e.g., one or more stress duct openings) disposed in the stem for metering flow of the liquid bait (i.e., bio-friendly active ingredient) from the reservoir to the insect feeding pool on the base; and a cover positioned atop the reservoir and extending radially outward therefrom to span and cover the base. The cover further houses at least one of a metered bioattractant dispenser, a metered biopathogen dispenser, a light source, a solar panel, or any combination thereof.

In certain aspects, the device further includes a sleeve disposed intermediate the reservoir and the cover, the sleeve housing a battery therein electrically connected to at least one of the metered bioattractant dispenser, the metered biopathogen dispenser, the light source, and the solar panel.

In certain aspects, the sleeve seats upon an annular flange circumferentially surrounding the reservoir.

In certain aspects, the sleeve and cover are separate components or, alternatively, are integrally formed.

In certain aspects, the flow path for the liquid bait is provided from the reservoir to the insect feeding pool on the base.

In certain aspects, at least one of the metered bioattractant dispenser, the metered biopathogen dispenser, the light source, the solar panel, or any combination thereof are affixed to an interior surface of the cover. In certain aspects, each of the metered bioattractant dispenser, the metered biopathogen dispenser, the light source, and the solar panel are affixed to an interior surface of the cover. In certain aspects, the metered bioattractant and metered biopathogen dispensers may be independently equipped with motion sensors to detect when flying insects are in close proximity to the metered bioattractant and/or metered biopathogen dispensers. Upon detection of this motion, the bioattractant and/or biopathogen may be dispensed from the metered bioattractant dispenser and/or the metered biopathogen dispenser thereby contacting the targeted insect with the biopathogen and/or bioattractant. In addition or in the alternative, the metered bioattractant dispenser and metered biopathogen dispenser may be operatively linked to a programmable timer to dispense the bioattractant and/or the biopathogen at predetermined times for predetermined time periods.

In certain aspects, the cover is transparent or translucent.

In certain aspects, the cover is spaced apart from the base and the stem to provide sufficient clearance there between to create a hospitable environment for a flying insect's entry and departure.

In certain aspects, the cover is bowl shaped.

In certain aspects, the stem connects the base to the reservoir such that the combination of the base, stem, and reservoir have an hourglass shape.

In certain aspects, the device further includes a stake configured for attachment to the base to secure the device in, for example, the ground.

In certain aspects, the bioattractants may include pheromones (sex, aggregation, food, etc.), synthetic and/or naturally occurring chemicals, color, sugar, light, perfume, carbon dioxide, octenol and other compounds that make up body odor. Bioattractants may further include simulating a soft buzzing sound of, for example, a female mosquito.

In certain aspects, biopathogens may include fungus (e.g., *Beauveria bassiana*, *Metarhizium anisopliae*, etc.), bacteria (e.g., *Wolbachia*), or a combination thereof that eradicates and/or disrupts insect mating. Fungus disclosed herein may be dispensed in spore form.

In certain aspects, the active ingredients (liquid bait) includes boric acid solution(s), mating disruptors, etc. coupled with, for example, inert ingredients such as a sugar solution.

When in use, these covered devices may dispense a predetermined, metered amount of bioattractant from the bioattractant dispenser thereby luring a specific airborne and/or crawling insect species to the device. If the insect species is, for example, mosquitoes sufficient clearance exists between the cover and the stem allowing the mosquitoes to fly freely around the device's cover. While underneath the cover, the mosquitoes may be contacted with a biospecific pathogen by dispensing a predetermined metered amount of biospecific pathogen from the metered biopathogen dispenser. In addition, the mosquitoes may be further contacted with and/or ingest an active ingredient (liquid bait) and subsequently leave the device for interaction with and possible mass remote extermination of other mosquitoes.

It should be appreciated by those skilled in the art that pest control strategies may be varied and specifically tailored to specifically targeted insect species and even to a specific insect's gender using the disclosed covered devices and cover assemblies. For example, in view of the above discussed mosquito control strategy, pest control strategies with the disclosed devices may be varied if specifically targeting male mosquitoes and/or female mosquitoes. Specifically, male mosquitoes have limited lifespans (~1 week or less) and their sole purpose is procreating with female mosquitoes. Furthermore, male mosquitoes do not require blood for survival but generally require sugar(s) for energy/survival. With this in mind and when attracting male mosquitoes with the disclosed devices and cover assemblies, the devices may include for example an active ingredient (e.g., boric acid solution) combined with a sugar solution, ultra violet light and a soft buzzing sound that simulates the female mosquito. Once the male mosquitoes have been attracted to the device, the male mosquito may subsequently ingest the boric acid sugar solution being dispensed from the reservoir, which acts as a procreation interrupter, and/or may be contacted with a biopathogen dispensed by the metered biopathogen dispenser. The male mosquitoes may subsequently leave the device but are unable to procreate with a female due to ingestion of the procreation interrupter and may further contaminate other mosquitoes with the biopathogen, thus leading to mass remote extermination of other mosquitoes.

Alternatively, when attracting female mosquitoes with the disclosed device, it is imperative to understand female mosquito biology. Female mosquito lifespan is approximately one month, and unlike male mosquitoes, female mosquitoes require human and/or vertebrate blood to produce proteins necessary for egg production post-insemination. During their lifespan, female mosquitoes mate only once, and if successfully inseminated, then produce eggs periodically over their lifespan. When attracting female mosquitoes with the disclosed devices, the metered bioattractant dispenser may dispense octenol, artificial blood, or other attractants, and light from the light source may be used as well. Bioattractants and biopathogens (e.g., *Wolbachia*) may be included with the active ingredient (e.g., boric acid solution) and/or optionally combined with a sugar solution being dispensed from the device's reservoir. Once the female mosquitoes have been attracted to the device, the female mosquito may subsequently ingest the boric acid solution that may also include, for example, *Wolbachia*—a sterilizing bacterium that prevents procreation. In addition and/or in the alternative, the female mosquitoes may be contacted with a biopathogen (e.g., a fungus or bacterium such as *Wolbachia*) being dispensed from the metered biopathogen dispenser. The female mosquitoes may subsequently leave the device but are unable to procreate with a male due to being contacted with *Wolbachia* but may further contaminate other mosquitoes with the biopathogen, thus leading to mass remote extermination of other mosquitoes.

In certain aspects, the disclosed covered devices and cover assemblies may be used to directly target and control homoptera including, but not limited to, aphids, mealy bugs, scale, psyllids and other plant damaging and disease vectoring homoptera insects. Homoptera are a worldwide, multi-crop problem whereby the insect, as an adult and in several instar stages feed on and damage plant tissues, particularly the flush, new growth, for the nitrogen. Adult homoptera are attracted to the flush, new growth by its color and aroma. When attracting the homoptera with the disclosed devices, a bioattractant simulating new flush growth aroma may be dispensed by the metered bioattractant dispenser to attractant the homoptera underneath the cover of the device. Once within the cover, a biopathogen (e.g., a fungus) may be dispensed from biopathogen dispenser onto the homoptera. Furthermore, the active ingredient (e.g., boric acid solution) may be dispensed from the base (e.g., the membrane ring and/or feeding pool) and ingested by the homoptera. After being contacted with the biopathogen and/or ingesting the active ingredient, the homoptera preferably leaves the device, interacts with other homoptera thereby contaminating other homoptera with the biopathogen and/or active ingredient, thus leading to mass remote extermination of other homoptera.

In other aspects, the disclosed devices and cover assemblies may be used to indirectly target homoptera by controlling ant populations as disclosed, for example, in U.S. Pat. Nos. 6,467,216 and 7,278,235 thereby affecting ant/homoptera mutualism. Ant/homoptera mutualism is a worldwide, multi-crop condition wherein ants protect and farm aphids, mealy bugs, scale, psyllids and other plant damaging and disease vectoring homoptera for their honeydew. By removing the ants, the homoptera can be eliminated by the ladybugs, lacewings, wasps, spiders, and other beneficial insects.

In other aspects, the disclosed devices and cover assemblies may be used to indirectly target homoptera by contaminating foraging ants with fungus or other biopathogen(s) provided in the feeding pool; dispensed by the metered biopathogen dispenser, or by contact with the membrane ring positioned on the base of the device, thereby eliminating the homoptera the ants come in contact with as they farm and protect them and leading to mass remote extermination of other homoptera.

As further alluded to above, existing pest control devices may be retrofitted with cover assemblies disclosed herein to have substantially similar function as those covered devices discussed immediately above, thus providing for enhanced targeting of, for example, specific airborne and crawling insect species by creating and maintaining a hospitable environment. In certain aspects, the pest control device cover assemblies include a cover adapted for attachment atop a reservoir of a pest control device and to extend radially outward therefrom to span and cover a base of the pest control device. The cover assemblies further include at least one of a metered bioattractant dispenser, a metered biopathogen dispenser, a light source, a solar panel or any combination thereof is housed in the cover.

In certain aspects, the cover assembly further includes a sleeve that is either a separate component from or integrally formed with the cover such that the sleeve is disposed intermediate the cover and the reservoir of the pest control device when attached to the pest control device.

In certain aspects, the cover assembly further includes a battery housed within the sleeve and adapted for electrical connection to at least one of the metered bioattractant dispenser, the metered biopathogen dispenser, the light source, and the solar panel. For example, the solar panel may be electrically connected to the battery to charge and/or re-charge the battery. The battery may be further electrically connected to the metered bioattractant dispenser, the metered biopathogen dispenser, and/or the light source thereby functioning as a primary or auxiliary power source.

In certain aspects, the sleeve of the cover assembly is adapted to seat upon an annular flange on the reservoir of the pest control device.

In certain aspects, at least one of the metered bioattractant dispenser, the metered biopathogen dispenser, the light source, the solar panel, or any combination thereof are removably attached to an interior surface of the cover of the cover assembly.

In certain aspects, the cover of the cover assembly is transparent or translucent, and may further be bowl shaped.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Disclosed are devices and cover assemblies that retrofit existing devices for targeting specific airborne and crawling insect species, such as for example, mosquitoes, aphids, psyllids, mealybugs, scale and other plant sucking, disease vectoring homoptera, ants, fruit flies, diamondback moth and balsam woolly adelgid, and mosquitoes, ticks, bedbugs, ants, termites, and cinch bugs. These devices and cover assemblies are preferably weather tolerant and are adapted for long term outdoor use.

Figure 1:
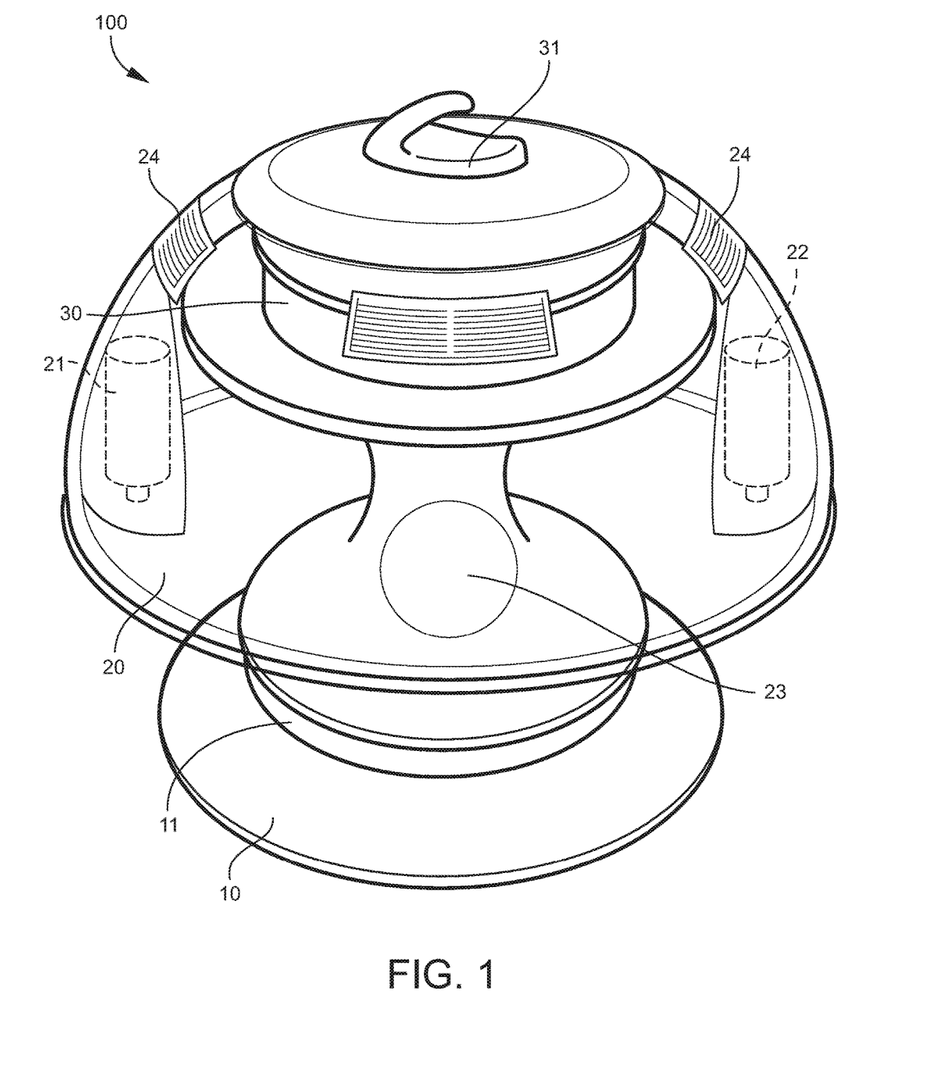
FIG. 1 depicts a device for eliminating airborne and crawling insect pests.
Figure 2:
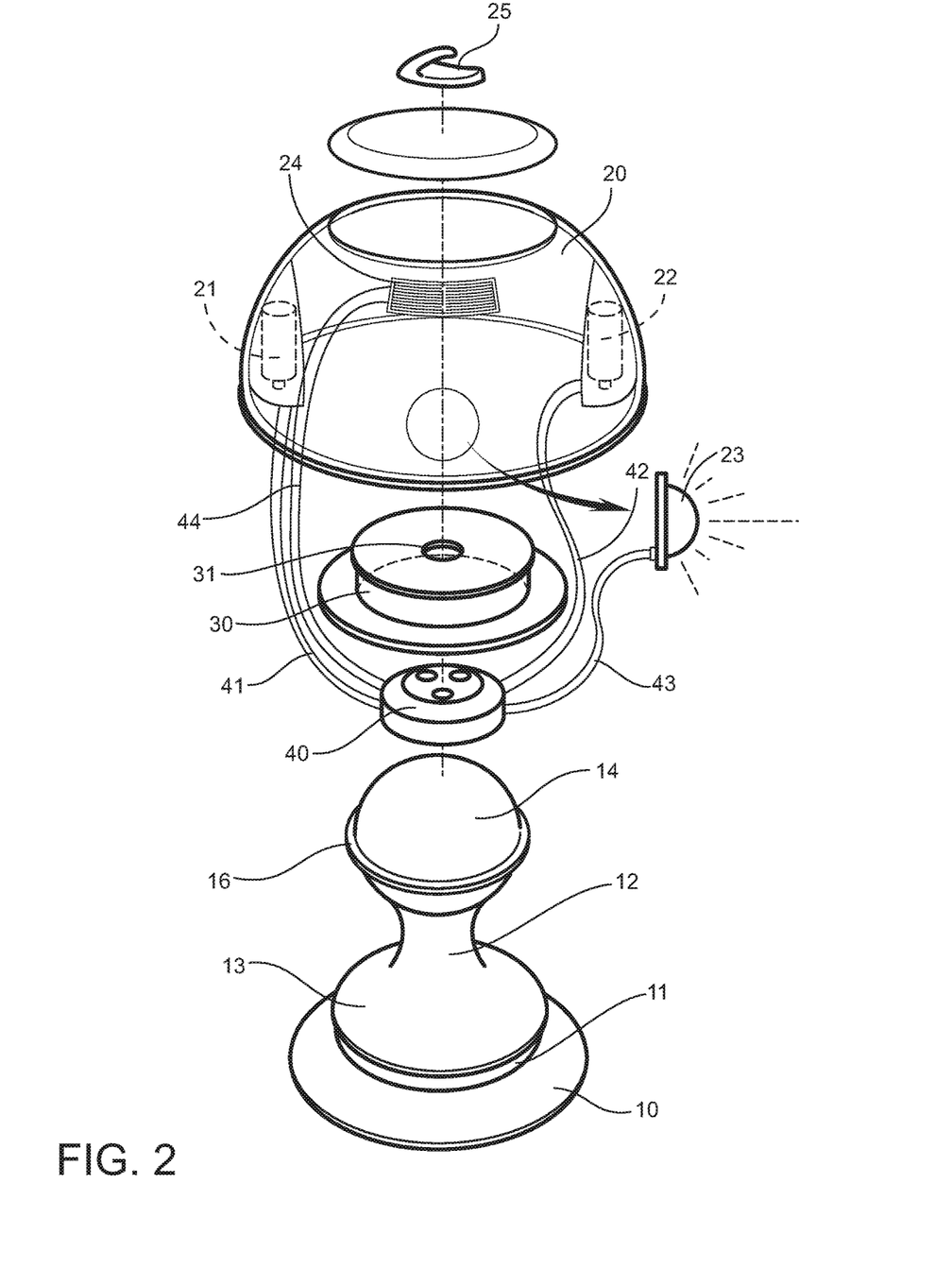
FIG. 2 depicts an exploded view of the device shown in FIG. 1.

FIGS. 1 and 2 depict an exemplary device 100 for targeting and eliminating specific airborne and crawling insects. As shown in FIG. 1, the device preferably includes a base 10 carrying a membrane ring 11 and insect feeding pool 17 for dispensing liquid bait; a stem 12 mounted to the base having a lower portion 13 that covers the membrane ring and insect feeding pool; a reservoir 14 positioned atop the stem 12, the reservoir 14 adapted to contain liquid bait; a valve 15 (i.e., one or more stress duct openings) disposed in the stem for metering flow of the liquid bait from the reservoir 14 to the insect feeding pool 17; and a cover 20 positioned atop the reservoir 14 and extending radially outward therefrom to span and cover the base 10. The cover 20 houses at least one of a metered bioattractant dispenser 21, a metered biopathogen dispenser 22, a light source 23, a solar panel 24, or any combination thereof, and in preferred aspects, the cover 20 houses at least a metered bioattractant dispenser 21, a metered biopathogen dispenser 22, a light source 23, and a solar panel 24.

Figure 4:
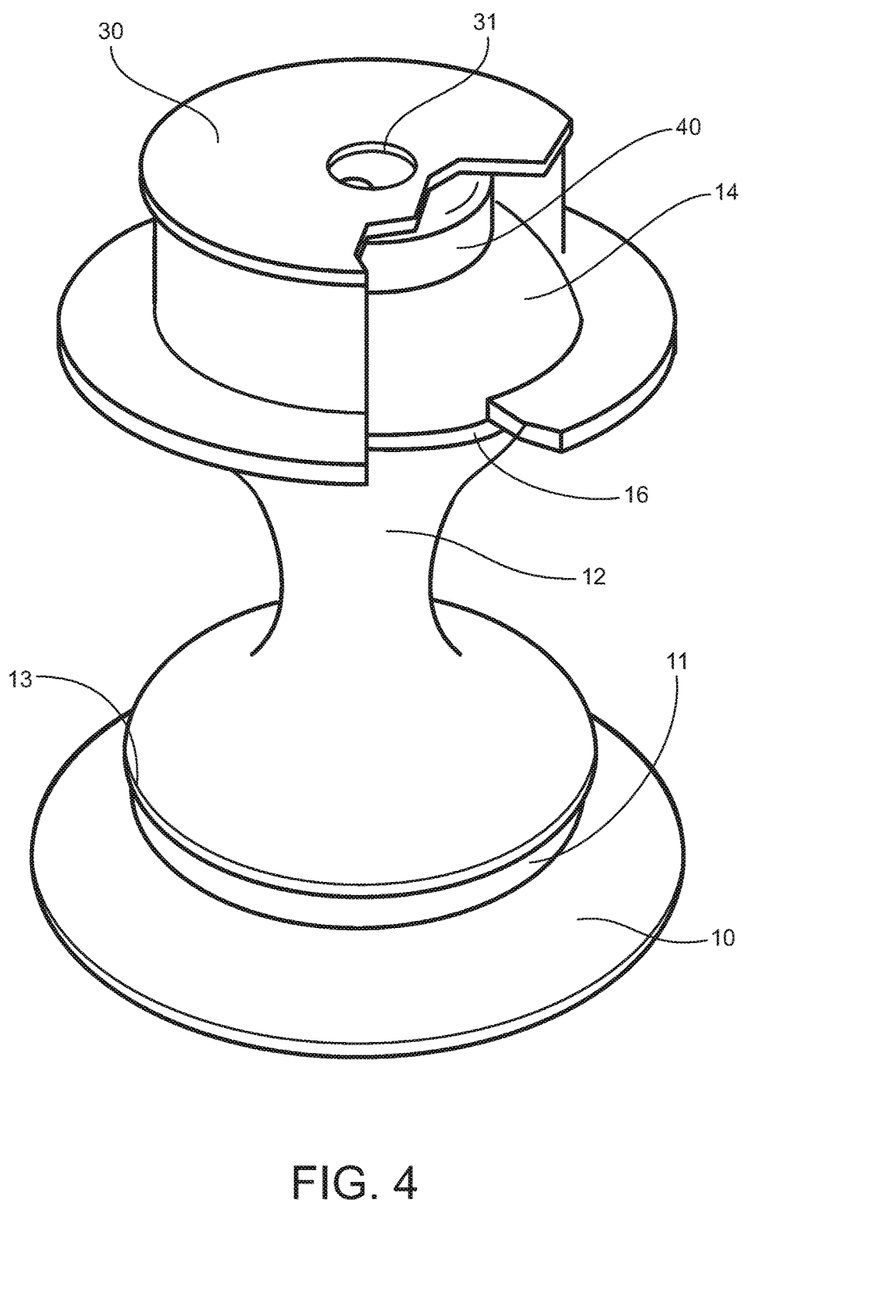
FIG. 4 depicts a sleeve of the cover assembly positioned atop the pest control device for attaching the cover assembly to the pest control device.

In certain aspects and as shown in FIGS. 1 and 4, the cover 20 attaches to a flange (e.g., an annular flange) 16 on the reservoir 14 via a press-fit engagement, sliding engagement, or threaded engagement. When attached, enough clearance exists between the inner surface of the cover and the stem to create a hospitable environment for flying insects such that these insects may fly around underneath the inner surface of the cover 20 while being contacted with the biopathogen and/or bioattractant. As further shown in FIG.

1, a metered bioattractant dispenser 21, a metered biopathogen dispenser 22, a light source 23, one or more solar panels 24, or any combination thereof may be attached to the inner surface of the cover 20. For example, each of the metered bioattractant dispenser 21, the metered biopathogen dispenser 22, the light source 24, and one or more solar panels may be removably attached to or integrally formed on an inner surface of the cover 20. In certain aspects, the cover 20 is bowl or dome shaped and the metered bioattractant dispenser 21 and metered biopathogen dispenser 22 are attached to the inner diameter of the bowl or dome shaped cover 20 and are spaced apart relative to each other in order to maximize efficacy of the bioattractant and biopathogen being dispensed from the metered bioattractant dispenser 21 and metered biopathogen dispenser 22 respectively. Similar to the metered dispensers and as further shown in FIG. 1, two or more solar panels 24 may be attached to the inner surface/diameter of the cover 20 and spaced apart relative to one another and relative to the metered bioattractant dispenser 21 and the metered biopathogen dispensers 22.

FIG. 2 depicts a partially exploded view of the device shown in FIG. 1. In particular, FIG. 2 shows the base 10, stem 12, and reservoir 14 of the device being assembled but further shows the cover 20, metered bioattractant dispenser 21, metered biopathogen dispenser 22, light source 23, and solar panels 24 in an exploded view. In certain aspects and as shown in FIGS. 2 and 4, a sleeve 30 may be included in the disclosed devices and assemblies. For example, sleeve 30 is disposed intermediate the reservoir 14 and cover 20 such that the sleeve seats onto the flange 16 positioned on the reservoir 14. In certain aspects, the cover 20 may further seat on or be integrally formed with sleeve 30. If sleeve 30 is not integrally formed with cover 20, locking member 25 may be included to secure cover 20 to opening 31 in the sleeve 30 via an interference fit or threaded engagement. As further shown in FIGS. 1, 2, and 4, a battery 40 may be housed in a recess of the sleeve 30 such that the battery 40 is concealed when the device and/or cover assemblies are assembled. The battery 40 is preferably electrically connected to solar panel(s) 24 such that the solar panels recharge battery as needed. Battery 40 is further electrically connected (41, 42, 43, and 44 respectively) to any of the metered bioattractant dispenser 21, the metered biopathogen dispenser 22, the light source 23, and the solar panel 24 to provide a primary and/or an auxiliary power source to metered bioattractant dispenser, the metered biopathogen dispenser, the light source when in operation. FIG. 4 further shows only sleeve 30 seated atop of reservoir 14, and in particular, how sleeve 30 removably engages, for example, the reservoir's annular flange 16 to secure the sleeve to the reservoir.

Figure 3:
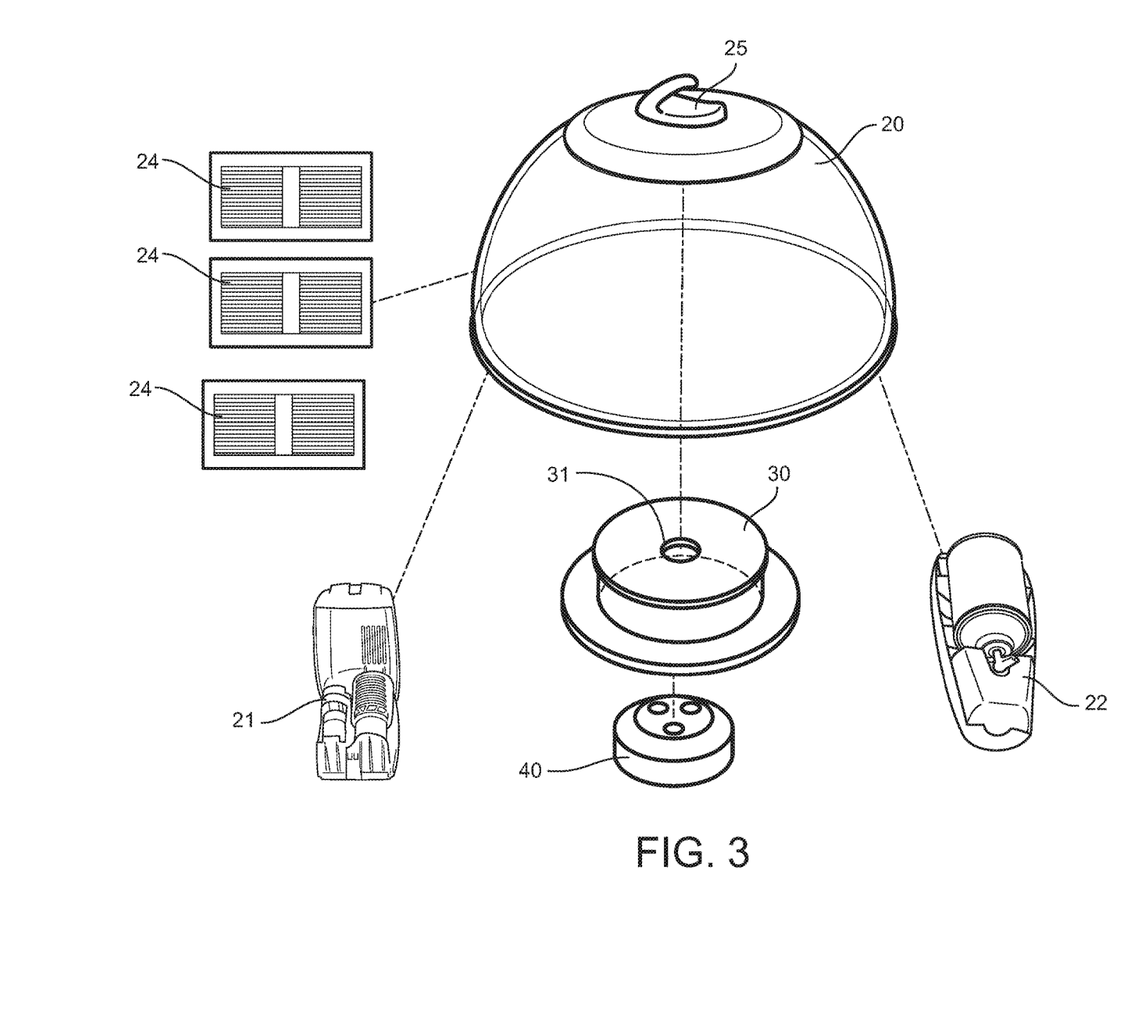
FIG. 3 depicts a cover assembly configured for attachment to a pest control device.

FIG. 3 further depicts the individual components of the disclosed cover assemblies and covered portions of the covered devices. Specifically shown are the cover 20, the sleeve 30, the battery 40, the metered biopathogen dispenser 22, and the metered bioattractant dispenser 21.

Figure 5:
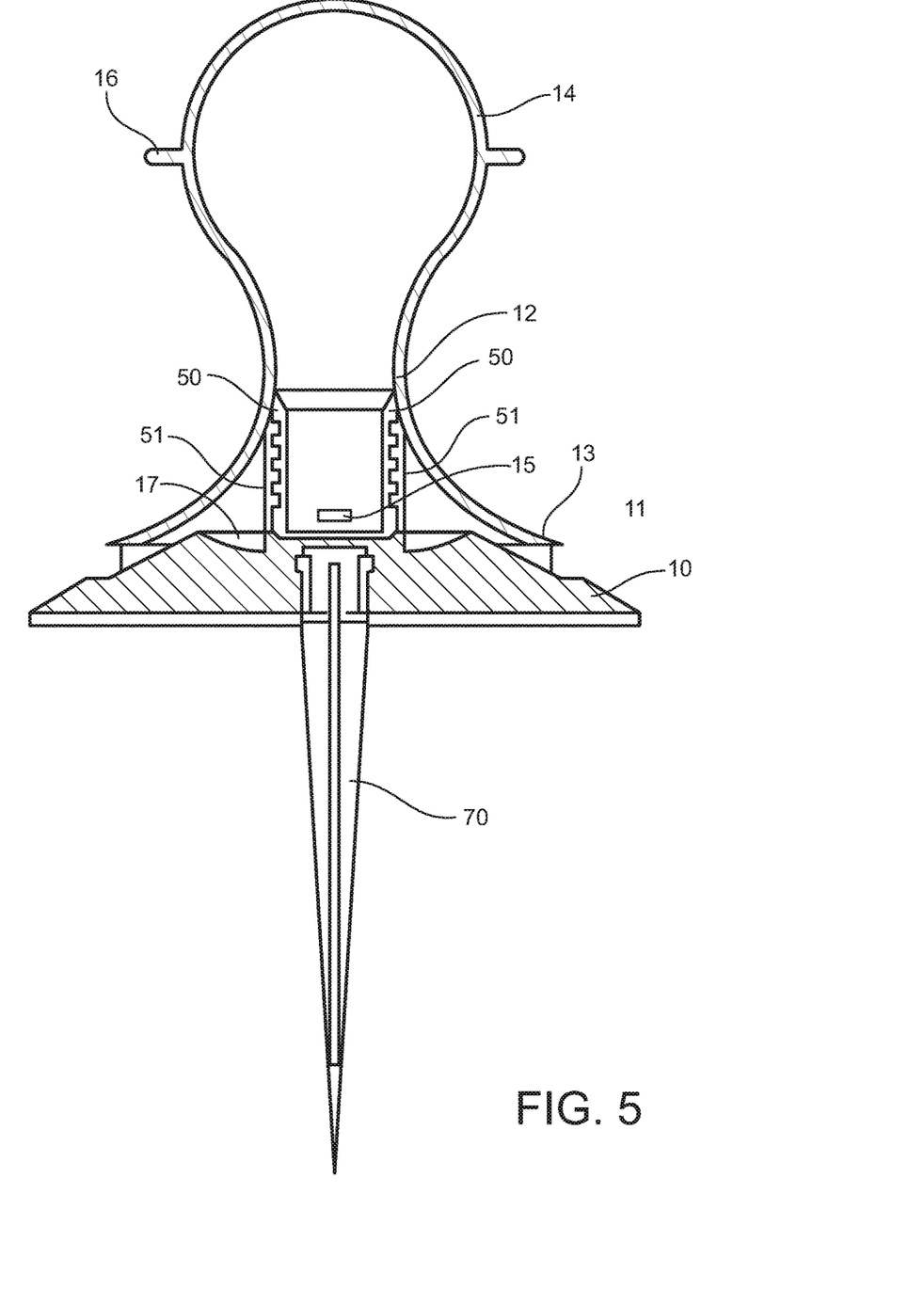
FIG. 5 depicts a cross-section of the pest control device to which the cover assembly attaches thereto.

FIG. 5 further depicts a partial cross section of an existing pest control device to which disclosed cover assemblies wherein the existing pest control device includes a reservoir 14, stem 12, and base 10 in which a first connecting portion 50 is positioned in the stem and mates with a second connecting portion 51 positioned on the base 10. In certain aspects, the first and second connecting portions 50, 51 are adapted for threaded engagement to assemble the existing pest control device. As shown in FIG. 5, in certain aspects, the first connecting portion 50 forms an integral part between the reservoir 14 and the stem 12. The reservoir 14 fluidly communicates with the stem 12 to form a conduit for the liquid bait to be dispensed from the reservoir 14 onto the insect feeding pool 17 positioned in the base 10.

In certain aspects, the existing pest control devices include a lower portion/shield 13 that flares from the stem 12 as an integral part thereof, or an attachment thereto, according to predetermined design. The lower portion/shield 13 preferably extends outward from the stem to form an overhang, in which the membrane ring 11 and insect feeding pool 17 are positioned between the shield 13 and base 10 and recessed relative to the shield 13 and base 10. The membrane ring 11 may extend completely around the device. Furthermore, coverage of the membrane ring 11 and insect feeding pool 17 by the lower portion/shield 13 protects the liquid bait from sun, rain and other environmental conditions known to cause evaporation, deterioration, dilution, or other negative results. It is contemplated that the shield 13 may be formed from various materials or combinations of materials, so long as the shield functions in a manner as described herein. The base 10 may further provide for a threaded engagement or a locking engagement (e.g., with a locking screw) to secure the reservoir 14 to the base 10. The base 10 may be further configured to receive stake 70, which may be used to secure device 100 to a desired surface (e.g., the ground).

In view of FIGS. 3-5, the cover assembly of FIG. 3 may be retrofitted to an existing pest control device as shown, for example, in FIG. 5. In particular, sleeve 20 of the cover assembly may securedly engage annular flange 16 of the pre-existing device. The cover assembly, when fully assembled preferably includes cover 20, the sleeve 30, the battery 40, the metered biopathogen dispenser 22, and the metered bioattractant dispenser 21 secured to the existing pest control device having substantially the same configuration(s) as discussed, for example, in view of FIGS. 1 and 2.

Figure 6A:
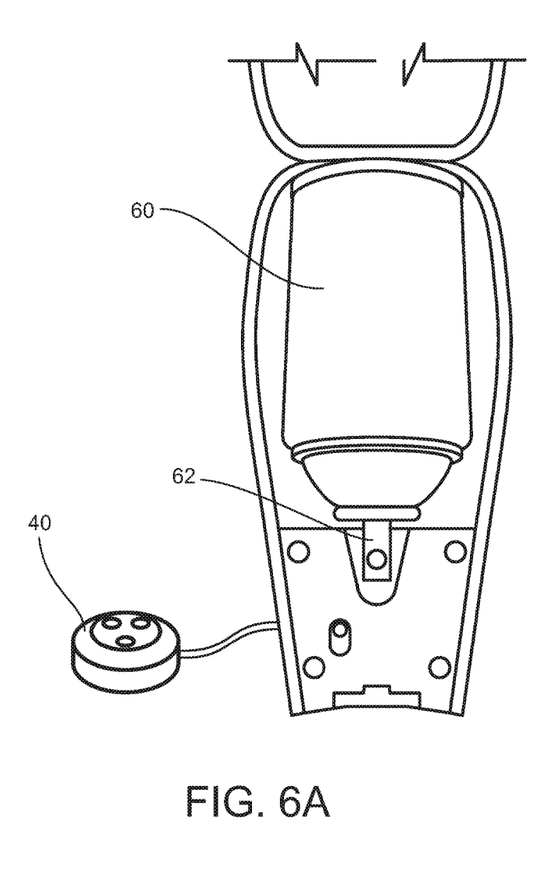
FIG. 6A depicts an exemplary metered dispenser configured to dispense the bioattractant and/or the biopathogen.
Figure 6B:
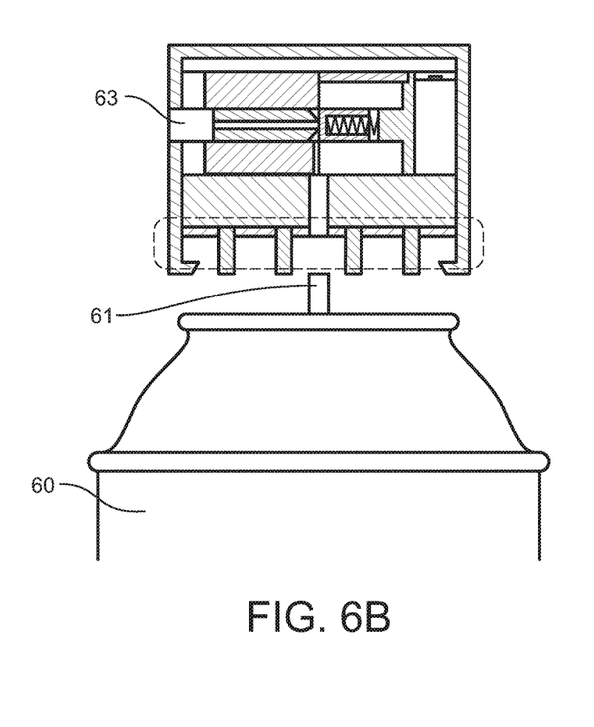
FIG. 6B depicts a motion sensor configured for attachment to the metered dispenser to selectively control dispensing of the bioattractant and/or biopathogen.

As discussed above, metered biopathogen dispensers 22 and metered bioattractant dispensers 21 are contemplated in the disclosed devices and cover assemblies. FIG. 6A further depicts an exemplary metered dispenser (21 and/or 22) that may be used, for example to dispense, the disclosed bioattractant(s) and/or the disclosed biopathogens. As further shown in FIG. 6A, the metered dispenser may be electrically connected to battery 40 and the metered dispenser may include container 60 for storing the biopathogen or bioattractant therein. Container further includes outlet 61 for dispensing the biopathogen and/or bioattractant therefrom. In certain aspects, the outlet may include or be fluidly connected to an atomizing head 62 as shown in FIG. 6A, or as shown in FIG. 6B, outlet may include a motion sensor 63 adapted to dispense the bioattractant(s) and/or biopathogen(s) when motion is sensed within a predetermined proximity to the sensor. Timer(s) may also be included and positioned, for example, in sleeve 30. Timer(s) are preferably electrically connected to the metered bioattractant and biopathogen dispensers and to the light source. These timers may be used for activating and dispensing bioattractants and/or biopathogens, as well as activating and de-activating the light source, according to a predetermined and programmable schedule, thereby allowing the bioattractant, biopathogen, and light source to be dispensed and activated during optimal times for targeting the desired targeted insect. Similarly, the metered bioattractant and biopathogen dispensers and light source may be further configured for remote control and may be further configured to communicate with a computing system to report back various diagnostic information including levels of bioattractant(s) and biopathogen(s) remaining in the respective dispensers, levels of liquid bait remaining in the reservoir, and flow rates of bioattractant(s), biopathogen(s), and liquid bait, which may be used to further determine the degree of insect infestation in a localized area.

When in use, it is contemplated that the reservoir 14 receives and stores a quantity of liquid bait; typically enough to supply bait to the insect feeding pool 17 without replenishment for a period of several weeks. The reservoir 14 receives the bait via the stem 12. It is contemplated that various formulations of liquid bait may be used in conjunction with the covered LGFAES to eliminate the specifically targeted airborne and crawling insects. For example, boric acid used in varying strengths and formulations effectively eliminates many targeted insect species and is preferably included in the reservoir 14 of the disclosed devices. Liquid baits dispensed from the reservoir may further include a low toxicity chemical, insect growth regulator, mating disruption pheromone, or any additional biorational formulation. In particular, a formula of up to two percent boric acid and the balance as inert ingredients (e.g., a sugar solution) typically produces satisfactory insecticide and pesticide related results and may be included in the reservoir of the disclosed devices.

Exemplary bioattractants may include pheromones (sex, aggregation, food, etc.), synthetic and/or naturally occurring chemicals, color, sugar, light, perfume, carbon dioxide, octenol and other compounds that make up body odor. Bioattractants may further include simulating a soft buzzing sound of, for example, a female mosquito.

Exemplary biopathogens dispensed from the metered biopathogen dispenser may include fungus (e.g., *Beauveria bassiana, Metarhizium anisopliae*, etc.), bacteria (e.g., *Wolbachia*), or a combination thereof that eradicate and/or disrupt mating of an insect. Fungus may be dispensed in spore form.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A device for eliminating airborne and crawling insect pests, comprising:
    a base carrying a membrane ring and an insect feeding pool;
    a stem mounted to the base having a lower portion that covers the membrane ring and the insect feeding pool;
    a reservoir positioned atop the stem, the reservoir adapted to contain liquid bait;
    stress duct openings disposed in the stem for metering flow of the liquid bait from the reservoir to the insect feeding pool; and
    a cover positioned atop the reservoir and extending radially outward therefrom to span and cover the base, the cover housing a metered bioattractant dispenser, a metered biopathogen dispenser, and a light source and optionally a solar panel, wherein:
    a continuous circumferential opening is between a peripheral edge of the cover and the stem and extends around the device underneath the cover;
    the bioattractant dispenser, the metered biopathogen dispenser, and the light source are affixed to an interior surface of the cover above and adjacent to the continuous circumferential opening; and
    each of the metered bioattractant dispenser, the metered biopathogen dispenser, and the light source are configured for remote control and electronic communication with a computing device.

2. The device according to claim 1, further comprising a sleeve disposed intermediate the reservoir and the cover, the sleeve housing a battery therein electrically connected to at least one of the metered bioattractant dispenser, the metered biopathogen dispenser, the light source, and the solar panel.

3. The device according to claim 2, wherein the sleeve seats upon an annular flange circumferentially surrounding the reservoir.

4. The device according to claim 3, wherein the sleeve and cover are separate components or are integrally formed.

5. The device according to claim 1, wherein a flow path for the liquid bait is provided from the reservoir to the insect feeding pool carried on the base.

6. The device according to claim 1, wherein the at least one of the metered bioattractant dispenser, the metered biopathogen dispenser, the light source, the solar panel, or any combination thereof are affixed to an interior surface of the cover.

7. The device according to claim 1, wherein the cover is transparent or translucent.

8. The device according to claim 1, wherein the cover is spaced apart from the base and the stem such that open space is provided between the cover and the stem and the base for airborne insect pest entry and departure.

9. The device according to claim 1, wherein the cover is bowl shaped.

10. The device according to claim 9, wherein the stem connects the base to the reservoir such that base, stem, and reservoir have an hourglass shape.

11. The device according to claim 10, further comprising a stake configured for attachment to a bottom of the base.

12. A pest control device cover assembly configured for attachment to a pest control device, comprising:
    a cover adapted for attachment atop a reservoir and extending radially outward therefrom to span and cover a base of the pest control device; and
    a metered bioattractant dispenser, a metered biopathogen dispenser, and a light source that are each housed in the cover and optionally a solar panel, wherein
    the pest control device cover assembly is adapted to define a continuous circumferential opening between a peripheral edge of the cover and a stem of a pest control device;
    the bioattractant dispenser, the metered biopathogen dispenser, and the light source are affixed to an interior surface of the cover above and adjacent to the continuous circumferential opening; and
    each of the metered bioattractant dispenser, the metered biopathogen dispenser, and the light source are configured for remote control and electronic communication with a computing device.

13. The pest control device cover assembly according to claim 12, further comprising a sleeve that is either a separate component from or integrally formed with the cover such that the sleeve is disposed intermediate the cover and the reservoir of the pest control device when attached to the pest control device.

14. The pest control device cover assembly according to claim 13, further comprising a battery housed within the sleeve and adapted for electrical connection to at least one of the metered bioattractant dispenser, the metered biopathogen dispenser, the light source, and the solar panel.

15. The pest control device cover assembly according to claim 14, wherein the sleeve is adapted to seat upon an annular flange.

16. The pest control device cover assembly according to claim 15, wherein the at least one of the metered bioattractant dispenser, the metered biopathogen dispenser, the light source, the solar panel, or any combination thereof are removably attached to an interior surface of the cover.

17. The pest control device cover assembly according to claim 16, wherein the cover is transparent or translucent.

18. The pest control device cover assembly according to claim 17, wherein the cover is bowl shaped.

19. The pest control device cover assembly according to claim 12, wherein the metered bioattractant dispenser and metered biopathogen dispenser electronically communicate amounts of bioattractant and biopathogen remaining in each respective dispenser such that diagnostic reports related to bioattractant flow rate and biopathogen flow rate are generated by the computing device to determine the degree of insect infestation in a localized area.

20. A device for eliminating airborne and crawling insect pests, comprising:
- a base carrying a membrane ring and an insect feeding pool;
- a stem mounted to the base having a lower portion that covers the membrane ring and the insect feeding pool;
- a reservoir positioned atop the stem, the reservoir adapted to contain liquid bait;
- stress duct openings disposed in the stem for metering flow of the liquid bait from the reservoir to the insect feeding pool; and
- a cover positioned atop the reservoir and extending radially outward therefrom to span and cover the base, the cover housing a metered bioattractant dispenser, a metered biopathogen dispenser, and a light source and optionally a solar panel, wherein:

each of the metered bioattractant dispenser, the metered biopathogen dispenser, and the light source are configured for remote control and electronic communication with a computing device, and the metered bioattractant dispenser and metered biopathogen dispenser electronically communicate amounts of bioattractant and biopathogen remaining in each respective dispenser such that diagnostic reports related to bioattractant flow rate and biopathogen flow rate are generated by the computing device to determine the degree of insect infestation in a localized area.

21. A pest control device cover assembly configured for attachment to a pest control device, comprising:
- a cover adapted for attachment atop a reservoir and extending radially outward therefrom to span and cover a base of the pest control device; and
- a metered bioattractant dispenser, a metered biopathogen dispenser, and a light source that are each housed in the cover and optionally a solar panel, wherein each of the metered bioattractant dispenser, the metered biopathogen dispenser, and the light source are configured for remote control and electronic communication with a computing device, and the metered bioattractant dispenser and metered biopathogen dispenser electronically communicate amounts of bioattractant and biopathogen remaining in each respective dispenser such that diagnostic reports related to bioattractant flow rate and biopathogen flow rate are generated by the computing device to determine the degree of insect infestation in a localized area.

* * * * *